United States Patent
Lei et al.

(10) Patent No.: US 10,575,327 B2
(45) Date of Patent: Feb. 25, 2020

(54) COLLISION AVOIDANCE IN A WIRELESS COMMUNICATION SYSTEM

(71) Applicant: Lenovo Innovations Limited (Hong Kong), Hong Kong (CN)

(72) Inventors: Haipeng Lei, Beijing (CN); Zukang Shen, Beijing (CN); Xiaodong Yu, Beijing (CN)

(73) Assignee: LENOVO INNOVATIONS LIMITED (HONG KONG), Hong Kong (CN)

( * ) Notice: Subject to any disclaimer, the term of this patent is extended or adjusted under 35 U.S.C. 154(b) by 0 days.

(21) Appl. No.: 15/776,943

(22) PCT Filed: Nov. 17, 2015

(86) PCT No.: PCT/CN2015/094776
§ 371 (c)(1),
(2) Date: May 17, 2018

(87) PCT Pub. No.: WO2017/084022
PCT Pub. Date: May 26, 2017

(65) Prior Publication Data
US 2018/0359777 A1    Dec. 13, 2018

(51) Int. Cl.
*H04W 74/04* (2009.01)
*H04W 72/04* (2009.01)

(52) U.S. Cl.
CPC ....... *H04W 74/04* (2013.01); *H04W 72/0453* (2013.01)

(58) Field of Classification Search
CPC ......... H04W 72/0453; H04W 72/1278; H04W 74/04; H04W 74/0808
See application file for complete search history.

(56) References Cited

U.S. PATENT DOCUMENTS

2016/0227579 A1* 8/2016 Stacey ............. H04W 74/0833
2018/0115981 A1* 4/2018 Kim .......................... H04L 1/18

FOREIGN PATENT DOCUMENTS

| CN | 102318421 A | 1/2012 |
| CN | 104054383 A | 9/2014 |
| WO | 2015/154524 A1 | 10/2015 |

OTHER PUBLICATIONS

PCT/CN2015/094776, International Search Report, dated Aug. 5, 2016, pp. 1-3.
(Continued)

Primary Examiner — Ayaz R Sheikh
Assistant Examiner — Debebe A Asefa
(74) Attorney, Agent, or Firm — Kunzler Bean & Adamson

(57) ABSTRACT

Apparatuses, methods, and systems are disclosed for collision avoidance. One apparatus includes a processor that detects energy in a detection slot within a first time period over a first frequency resource of a transmission resource unit ("TRU"). The TRU includes the first time period, a second time period contiguous in time with the first time period, a second frequency resource, and a third frequency resource contiguous in frequency with the second frequency resource. The energy is below a predetermined threshold. The apparatus also includes a transmitter that transmits a time-contiguous signal after the detection slot until an end of the first time period over the first frequency resource. The transmitter transmits data within the second time period over the third frequency resource. The transmitter transmits a scheduling assignment ("SA") within the second time period over the second frequency resource. The SA includes information related to the data.

20 Claims, 7 Drawing Sheets

(56) References Cited

OTHER PUBLICATIONS

PCT/CN2015/094776, Written Opinion of the International Searching Authority, dated Aug. 5, 2016, pp. 1-3.

\* cited by examiner

COLLISION AVOIDANCE IN A WIRELESS COMMUNICATION SYSTEM

FIELD

The subject matter disclosed herein relates generally to wireless communications and more particularly relates to collision avoidance in a wireless communication system.

BACKGROUND

The following abbreviations are herewith defined, at least some of which are referred to within the following description.
 3GPP Third Generation Partnership Project
 ACK Positive-Acknowledgment
 ANDSF Access Network Discovery and Selection Function
 AP Access Point
 APN Access Point Name
 BLER Block Error Ratio
 BPSK Binary Phase Shift Keying
 CAZAC Constant Amplitude Zero Auto Correction
 CCA Clear Channel Assessment
 CCE Control Channel Element
 CP Cyclic Prefix
 CQI Channel Quality Indicator
 CSI Channel State Information
 CSS Common Search Space
 D2D Device-to-Device
 DCI Downlink Control Information
 DL Downlink
 DMRS Demodulation Reference Signal
 eNB Evolved Node B
 EPDCCH Enhanced Physical Downlink Control Channel
 E-RAB E-UTRAN Radio Access Bearer
 ETSI European Telecommunications Standards Institute
 E-UTRAN Evolved Universal Terrestrial Radio Access Network
 FBE Frame Based Equipment
 FDD Frequency Division Duplex
 FDM Frequency Division Multiplexing
 FDMA Frequency Division Multiple Access
 FEC Forward Error Correction
 GPRS General Packet Radio Service
 GPT GPRS Tunneling Protocol
 HARQ Hybrid Automatic Repeat Request
 H-PLMN Home Public Land Mobile Network
 IP Internet Protocol
 ISRP Inter-System Routing Policy
 LAA Licensed Assisted Access
 LBE Load Based Equipment
 LBT Listen-Before-Talk
 LTE Long Term Evolution
 MCL Minimum Coupling Loss
 MCS Modulation and Coding Scheme
 MME Mobility Management Entity
 MU-MIMO Multi-User, Multiple-Input, Multiple-Output
 NACK or NAK Negative-Acknowledgment
 NAS Non-Access Stratum
 NBIFOM Network-Based IP Flow Mobility
 OFDM Orthogonal Frequency Division Multiplexing
 PCell Primary Cell
 PBCH Physical Broadcast Channel
 PCO Protocol Configuration Options
 PCRF Policy and Charging Rules Function
 PDCCH Physical Downlink Control Channel
 PDCP Packet Data Convergence Protocol
 PDN Packet Data Network
 PDSCH Physical Downlink Shared Channel
 PDU Protocol Data Unit
 PGW Packet Data Network Gateway
 PHICH Physical Hybrid ARQ Indicator Channel
 PLMN Public Land Mobile Network
 PMI Precoding Matrix Indicator
 PRACH Physical Random Access Channel
 PRB Physical Resource Block
 PTI Procedure Transaction Identity
 PUCCH Physical Uplink Control Channel
 PUSCH Physical Uplink Shared Channel
 QoS Quality of Service
 QPSK Quadrature Phase Shift Keying
 RAB Radio Access Bearer
 RAN Radio Access Network
 RAR Random Access Response
 RE Resource Element
 RI Rank Indicator
 RRC Radio Resource Control
 RX Receive
 SA Scheduling Assignment
 SC-FDMA Single Carrier Frequency Division Multiple Access
 SCell Secondary Cell
 SCH Shared Channel
 SGW Serving Gateway
 SIB System Information Block
 SINR Signal-to-Interference-Plus-Noise Ratio
 SR Scheduling Request
 TAU Tracking Area Update
 TB Transport Block
 TBS Transport Block Size
 TCP Transmission Control Protocol
 TDD Time-Division Duplex
 TDM Time Division Multiplex
 TEID Tunnel Endpoint Identification ("ID")
 TRU Transmission Resource Unit
 TX Transmit
 UCI Uplink Control Information
 UE User Entity/Equipment (Mobile Terminal)
 UL Uplink
 UMTS Universal Mobile Telecommunications System
 V2I Vehicle-to-Infrastructure
 V2N Vehicle-to-Network
 V2P Vehicle-to-Pedestrian
 V2X Vehicle-to-X
 V2V Vehicle-to-Vehicle
 V-PLMN Visited Public Land Mobile Network
 WiMAX Worldwide Interoperability for Microwave Access
 WLAN Wireless Local Area Network In wireless communications networks, V2X transmission and reception may be used. Resource allocation for V2X may be performed by eNB scheduling and/or by UE autonomous selection. eNB scheduling may work for in-network coverage scenarios in which the eNB can schedule the resource for served UEs taking into account various latency requirements of different services between the eNB and the UEs. UE autonomous resource selection may work for out-of-network coverage and may work for in-network coverage. In certain configurations, a UE may autonomously select a needed resource from a preconfigured resource pool with an equal probability for using each resource without a resource collision. As may be appreciated, eNB scheduling may be preferred in certain configurations because eNB scheduling may avoid possible resource collision that can happen in UE autonomous resource selection. In contrast, UE autonomous resource selection may be preferred in certain configurations because UE autonomous resource selection may save signaling overhead and work for out-of-network coverage.

In one configuration, an SA pool and its associated data pool may be time-multiplexed and located in different subframes. In such a configuration, the SA pool may be located before the associated data pool in the time domain. In some configurations, a minimum time period for transmission of the SA pool may be 40 ms. Even with the lowest SA pool time period, a UE may need to wait 40 ms to transmit one time. Accordingly, with such wait time, low latency requirements of V2X transmission may not be met. Moreover, in some configurations, a UE may randomly select a resource for SA transmission and its associated data transmission. Therefore, a first resource collision may occur for the randomly selected resource for SA transmission and a second resource collision may occur for the randomly selected associated data transmission.

BRIEF SUMMARY

Apparatuses for collision avoidance are disclosed. Methods and systems also perform the functions of the apparatus. In one embodiment, an apparatus includes a processor that detects a first energy in a first detection slot within a first time period over a first frequency resource of a first transmission resource unit ("TRU"). In such an embodiment, the first TRU includes the first time period, a second time period contiguous in time with the first time period, a second frequency resource, and a third frequency resource contiguous in frequency with the second frequency resource. The first energy may be below a predetermined threshold. The apparatus also includes a transmitter that transmits a first time-contiguous signal after the first detection slot until an end of the first time period over the first frequency resource. The transmitter also transmits first data within the second time period over the third frequency resource. The transmitter transmits a first scheduling assignment ("SA") within the second time period over the second frequency resource. The first SA may include information related to the first data.

In certain embodiments, a size of the first frequency resource is greater than or equal to a size of the second frequency resource and smaller than a combined size of the second and third frequency resources. In some embodiments, the processor detects a second energy in a second detection slot within the first time period over a fourth frequency resource of a second TRU. In such embodiments, the second TRU includes the first time period, the second time period, a fifth frequency resource, and a sixth frequency resource contiguous in frequency with the fifth frequency resource. The second energy may be below the predetermined threshold. Moreover, in such embodiments, the transmitter may transmit a second time-contiguous signal after the second detection slot until the end of the first time period over the fourth frequency resource. The transmitter may also transmit second data within the second time period over the sixth frequency resource. The transmitter may transmit a second SA within the second time period over the fifth frequency resource. The second SA may include information related to the second data. In certain embodiments, the transmitter may transmit second data within the second time period over a combined frequency resource of the fifth and sixth frequency resources. In such embodiments, the first SA may include information related to the second data.

In various embodiments, a size of the fourth frequency resource is greater than or equal to a size of the fifth frequency resource and smaller than a combined size of the fifth and sixth frequency resources. In such embodiments, the first TRU and second TRU are contiguous in frequency. In one embodiment, the processor determines at least one of a size of the first TRU, the first time period, the second time period, the first frequency resource, the second frequency resource, the third frequency resource, and the predetermined threshold based on configuration information from a network. In another embodiment, the processor determines at least one of a size of the first TRU, the first time period, the second time period, the first frequency resource, the second frequency resource, the third frequency resource, and the predetermined threshold based on preconfigured information.

In certain embodiments, at least one of a size of the first TRU, the first time period, the second time period, the first frequency resource, the second frequency resource, the third frequency resource, and the predetermined threshold is defined in a specification. In various embodiments, the first SA and the first data of the first TRU are in a same subframe and contiguous in a frequency domain. In some embodiments, the first time period includes multiple detection slots, the multiple detection slots include the first detection slot, and each detection slot of the multiple detection slots has a predetermined duration.

In various embodiments, the first detection slot is a detection slot randomly selected from multiple detection slots within the first time period. In some embodiments, the processor that detects the first energy also determines whether the first energy is below the predetermined threshold in a second detection slot of the multiple detection slots. Moreover, if the first energy is below the predetermined threshold in the second detection slot, the processor may generate a random backoff counter having an initial count within a range of 1 to N and repeat the following until the random backoff counter is counted down to zero indicating the first detection slot: determine whether the first energy is below the predetermined threshold in a next detection slot of the multiple detection slots; and decrement the random backoff counter by 1 if the first energy is below the predetermined threshold in the next detection slot.

In certain embodiments, the second detection slot is a detection slot positioned at a beginning time of the first time period in a time domain. In one embodiment, the first detection slot is a detection slot reached when a random backoff counter is counted down to zero. In various embodiments, the first time period begins at a subframe boundary.

In some embodiments, the processor detects a second energy in a second detection slot within the first time period over a fourth frequency resource of a second TRU. In such embodiments, the second TRU includes the first time period, the second time period, a fifth frequency resource, and a sixth frequency resource contiguous in frequency with the fifth frequency resource. The second energy may be below a predetermined threshold. Further, in such embodiments, the transmitter, if the second detection slot for the second TRU is earlier than the first detection slot for the first TRU: transmits a second time-contiguous signal after the second detection slot until the end of the first time period over the fourth frequency resource; transmits second data within the second time period over the sixth frequency resource; transmits a second SA within the second time period over the fifth frequency resource, wherein the second SA includes information related to the second data; and does not transmit the first time-contiguous signal, the first data, and the first SA.

One method for collision avoidance includes detecting a first energy in a first detection slot within a first time period over a first frequency resource of a first transmission resource unit ("TRU"). In such an embodiment, the first TRU includes the first time period, a second time period contiguous in time with the first time period, a second frequency resource, and a third frequency resource contiguous in frequency with the second frequency resource. The first energy may be below a predetermined threshold. The method also includes transmitting a first time-contiguous signal after the first detection slot until an end of the first time period over the first frequency resource. The method includes transmitting first data within the second time period over the third frequency resource. The method also includes transmitting a first scheduling assignment ("SA") within the second time period over the second frequency resource. The first SA may include information related to the first data.

In one embodiment, an apparatus includes a processor that detects first energy in a detection period and a detection bandwidth of a first transmission resource unit ("TRU"). The processor also determines whether the first energy is below a predetermined threshold for a first period of time. The processor selects the first TRU if the first energy is below the predetermined threshold for the first period of time. The apparatus also includes a transmitter that transmits a first signal after the first period of time to an end of the detection period in the first TRU. The transmitter also transmits scheduling assignment ("SA") and associated data in the first TRU. In one embodiment, the first signal is a dummy signal and just used to reserve the selected TRU. In another embodiment, the first signal is a preamble with a predefined sequence and used for TRU reservation.

In one embodiment, the processor determines at least one of a size of the first TRU, the detection period, the detection bandwidth, and the predetermined threshold based on configuration information from a network. In another embodiment, the processor determines at least one of a size of the first TRU, the detection period, the detection bandwidth, and the predetermined threshold based on preconfigured information. In some embodiments, the first period of time is a random period of time smaller than the detection period. In various embodiments, the detection period includes multiple detection slots. Each detection slot of the multiple detection slots may have a predetermined duration.

In certain embodiments, the processor that determines whether the first energy is below the predetermined threshold for the first period of time further determines whether the first energy is below the predetermined threshold in a first detection slot of the plurality of detection slots. In such embodiments, if the first energy is below the predetermined threshold in the first detection slot, the processor generates a random backoff counter having an initial count within a range of 1 to N. Moreover, the processor repeats the following until the random backoff counter is counted down to zero indicating a completion of the first period of time: the processor determines whether the first energy is below the predetermined threshold in a next detection slot of the multiple detection slots; and the processor decrements the random backoff counter by 1 if the first energy is below the predetermined threshold in the next detection slot.

In one embodiment, the processor detects second energy in the detection period and the detection bandwidth of a second TRU. In such an embodiment, the processor determines whether the second energy is below the predetermined threshold for a second period of time. Moreover, the processor selects the second TRU if the second energy is below the predetermined threshold for the second period of time and the second period of time ends before the completion of the first period of time for the first TRU. Furthermore, the transmitter transmits a second signal after the second period of time to the end of the detection period in the second TRU. The transmitter also transmits the SA and the associated data in the second TRU. In one embodiment, the second signal is a dummy signal and just used to reserve the selected TRU. In another embodiment, the second signal is a preamble with a predefined sequence and used for TRU reservation.

In certain embodiments, the transmitter that transmits the SA and the associated data in the first TRU further transmits the SA at a first frequency and the associated data at a second frequency in a same subframe. In such embodiments, the first frequency and the second frequency are contiguous in a frequency domain and the first frequency is greater than the second frequency. In various embodiments, the transmitter that transmits the SA and the associated data in the first TRU further transmits the SA at a first frequency and the associated data at a second frequency in a same subframe. In such embodiments, the first frequency and the second frequency are contiguous in a frequency domain and the first frequency is less than the second frequency. In one embodiment, the detection period begins at a subframe boundary. In another embodiment, the detection period begins at the last symbol of one subframe and ends before the first symbol of next subframe.

One method for collision avoidance includes detecting first energy in a detection period and a detection bandwidth of a first transmission resource unit ("TRU"). The method also includes determining whether the first energy is below a predetermined threshold for a first period of time. Moreover, if the first energy is below the predetermined threshold for the first period of time, the method includes: selecting the first TRU; transmitting a first signal after the first period of time to an end of the detection period in the first TRU; and transmitting scheduling assignment ("SA") and associated data in the first TRU. In one embodiment, the first signal is a dummy signal and just used to reserve the selected TRU. In another embodiment, the first signal is a preamble with a predefined sequence and used for TRU reservation.

In one embodiment, the method includes determining at least one of a size of the first TRU, the detection period, the detection bandwidth, and the predetermined threshold based on configuration information from a network. In another embodiment, the method includes determining at least one of a size of the first TRU, the detection period, the detection bandwidth, and the predetermined threshold based on pre-configured information.

In certain embodiments, the method includes detecting second energy in the detection period and the detection bandwidth of a second TRU. In such embodiments, the method also includes determining whether the second energy is below the predetermined threshold for a second period of time. If the second energy is below the predetermined threshold for the second period of time and the second period of time ends before the completion of the first period of time for the first TRU, the method includes: selecting the second TRU; transmitting a second signal after the second period of time to the end of the detection period in the second TRU; and transmitting the SA and the associated data in the second TRU. In one embodiment, the second signal is a dummy signal and just used to reserve the selected TRU. In another embodiment, the second signal is a preamble with a predefined sequence and used for TRU reservation.

Another method for collision avoidance includes detecting a respective energy in a detection period and a detection bandwidth corresponding to each transmission resource unit ("TRU") of a plurality of TRUs. The method also includes determining whether the respective energy is below a predetermined threshold for a respective period of time. The method includes selecting a respective TRU with the completion of the respective period of time before the end of detection period. The method also includes transmitting a signal after the respective period of time to an end of the detection period in the respective TRU. In one embodiment, the signal is a dummy signal and just used to reserve the selected TRU. In another embodiment, the signal is a preamble with a predefined sequence and used for TRU reservation. The method includes transmitting scheduling assignment ("SA") and associated data in the respective TRU.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
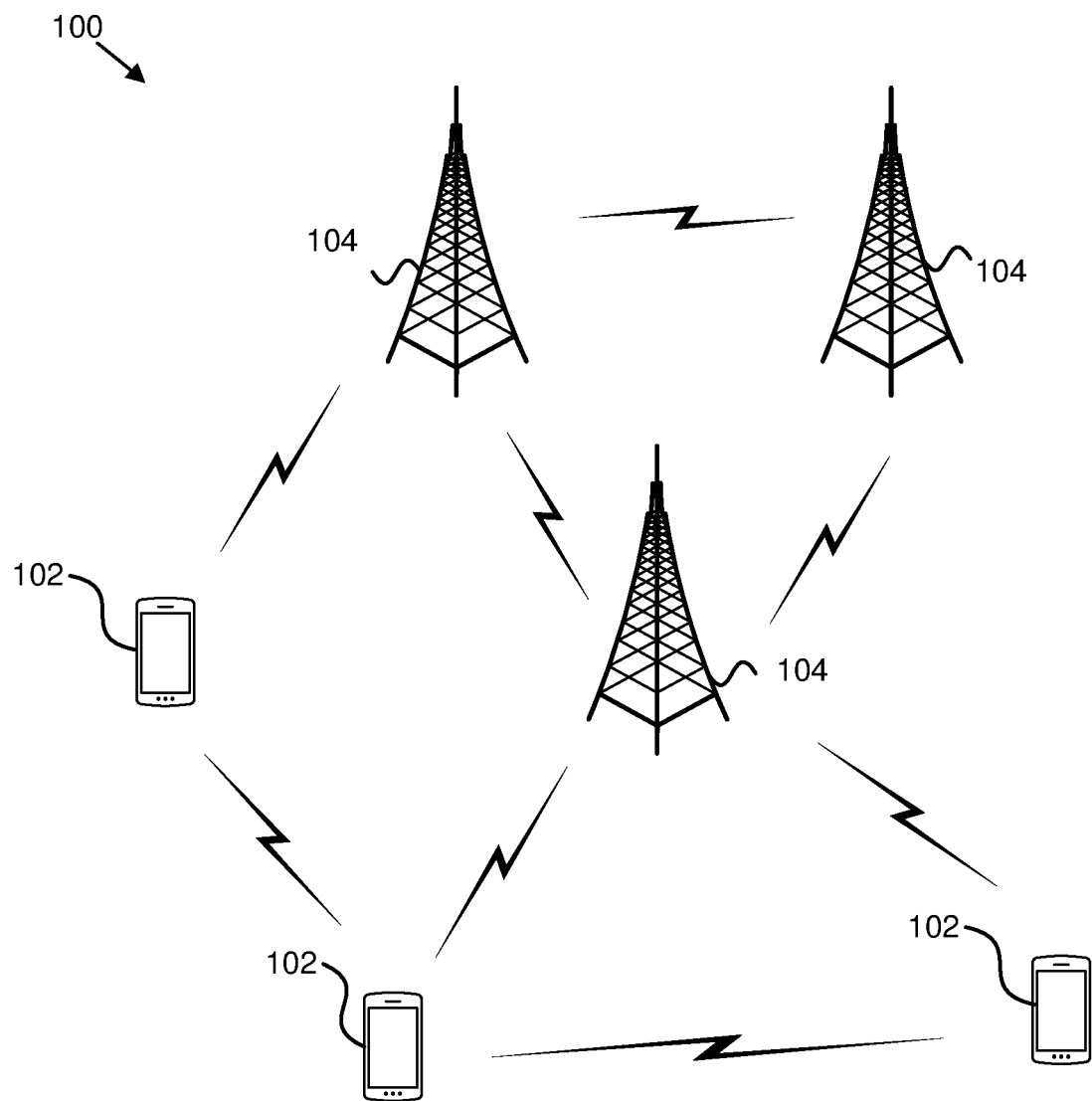
FIG. 1 is a schematic block diagram illustrating one embodiment of a wireless communication system for collision avoidance.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for collision avoidance. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, a vehicle, or by other terminology used in the art. The remote units 102 may communicate directly with one or more of the base units 104 via UL communication signals. Moreover, reach remote unit 102 may communicate directly with one or more of the other remote units 102 (e.g., using sidelink signals, V2V communication, D2D communication, etc.).

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., UE, vehicle, remote unit 102) may detect energy in a detection period and a detection bandwidth of a TRU. The apparatus may determine whether the energy is below a predetermined threshold for a period of time. Moreover, if the energy is below the predetermined threshold for the period of time, the apparatus may select the TRU, transmit a signal after the period of time and within the detection period in the TRU, and transmit SA and associated data in the TRU. Accordingly, the apparatus determines that the TRU is not being used by another remote unit 102 because the energy during the detection period is less than the predetermined threshold, before the apparatus begins transmitting using the TRU. Thus, the apparatus may avoid collisions by not transmitting on TRUs that are being used for transmission by other devices.

In another embodiment, an apparatus (e.g., UE, vehicle, remote unit 102), may detect energy in a detection slot within a first time period over a first frequency resource of a TRU. The TRU may include the first time period, a second time period contiguous in time with the first time period, a second frequency resource, and a third frequency resource contiguous in frequency with the second frequency resource. The energy may be below a predetermined threshold. The apparatus may also transmit a time-contiguous signal after the detection slot until an end of the first time period over the first frequency resource. The apparatus may transmit data within the second time period over the third frequency resource. The apparatus may also transmit an SA within the second time period over the second frequency resource. The SA may include information related to the data.

Figure 2:
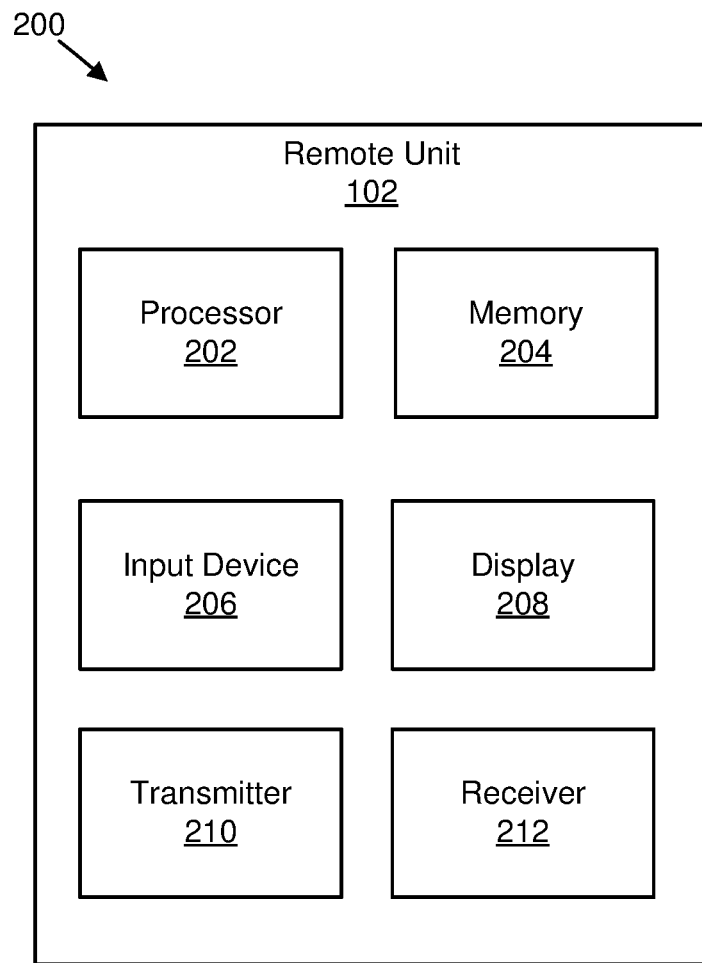
FIG. 2 is a schematic block diagram illustrating one embodiment of an apparatus that may be used for collision avoidance.

FIG. 2 depicts one embodiment of an apparatus 200 that may be used for collision avoidance. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may detect energy in a detection slot of a frequency resource of a TRU. In some embodiments, the processor 202 may determine whether the energy is below a predetermined threshold for a period of time. In various embodiments, the processor 202 may select the TRU if the energy is below the predetermined threshold for the period of time.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to information to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and/or sidelink signals to other remote units 102. The receiver 212 is used to receive DL communication signals from the base unit 104 and/or sidelink communication signals from other remote units 102. In one embodiment, the transmitter 210 is used to transmit a time-contiguous signal after a period of time and within a detection period (e.g., first period of time) in a TRU and to transmit SA and associated data in frequency resources of the TRU. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
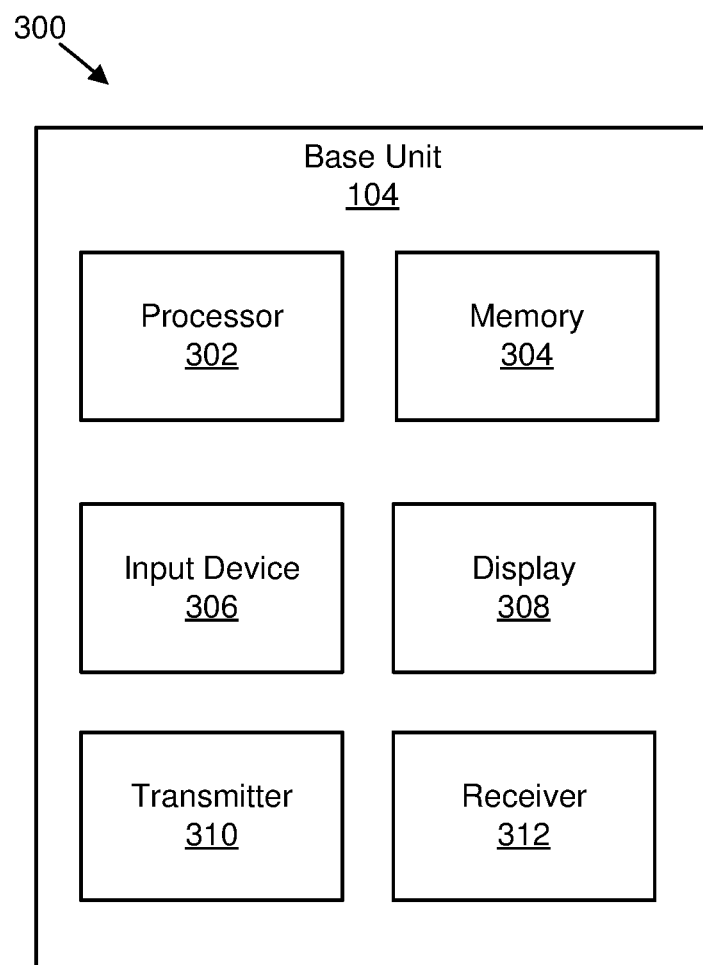
FIG. 3 is a schematic block diagram illustrating another embodiment of an apparatus that may be used for collision avoidance.

FIG. 3 depicts another embodiment of an apparatus 300 that may be used for collision avoidance. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The transmitter 310 is used to provide DL communication signals to the remote unit 102 and the receiver 312 is used to receive UL communication signals from the remote unit 102. In certain embodiments, the receiver 312 is used to receive time-contiguous signals, SA, and associated data in a TRU transmitted from the remote unit 102.

Figure 4:
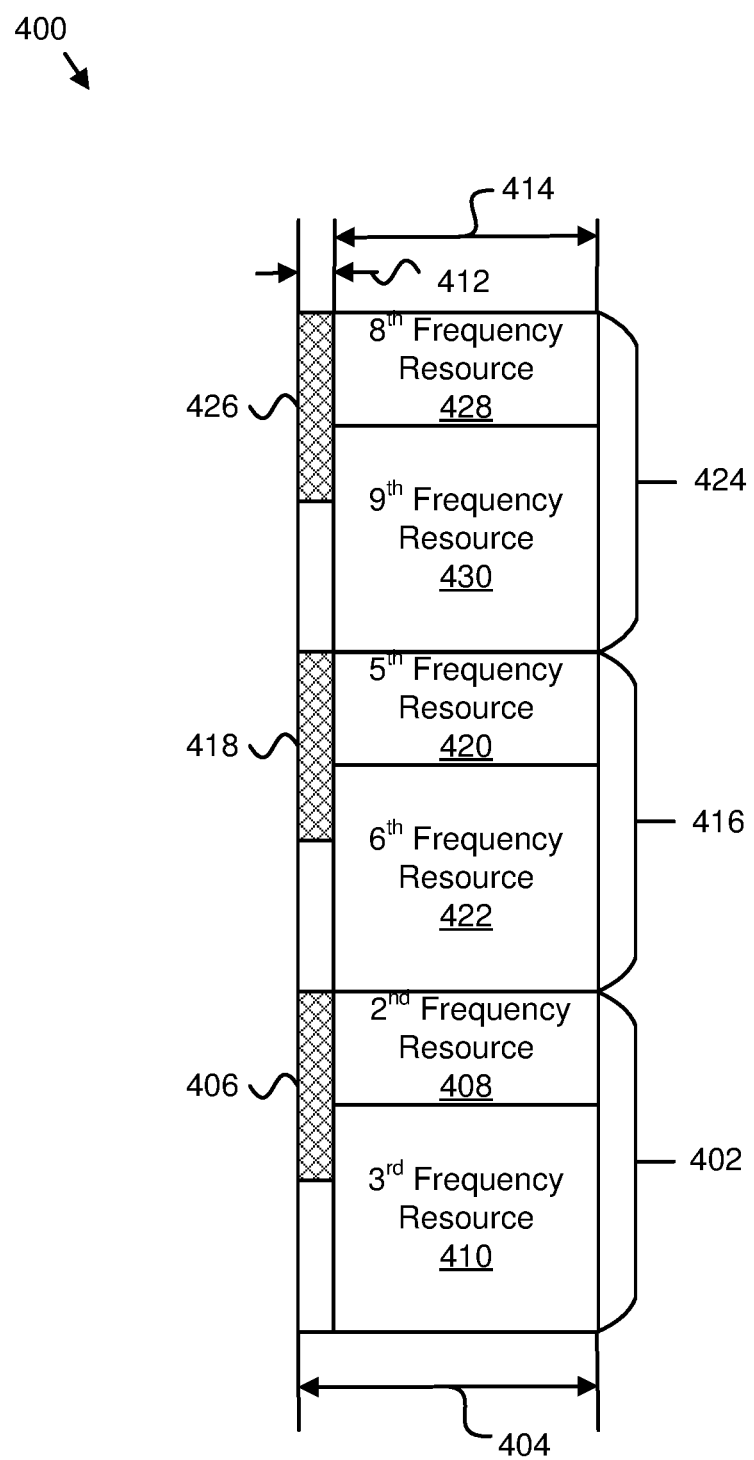
FIG. 4 is a schematic block diagram illustrating one embodiment of communication for collision avoidance.

FIG. 4 is a schematic block diagram illustrating one embodiment of communication 400 for collision avoidance. Remote units 102 may communicate autonomous resource selection using transmission resource units ("TRUs") transmitted using FDM. Three TRUs are illustrated: a first TRU 402, a second TRU 416, and a third TRU 424. While three TRUs are illustrated, any number of TRUs may be used. As may be appreciated, the number of TRUs that are used may depend on the number of frequencies available for transmission. In some embodiments, the first TRU 402 and the second TRU 416 are contiguous in frequency, and the second TRU 416 and the third TRU 424 are contiguous in frequency.

The TRUs 402, 416, 424 are transmitted in one subframe 404 and are contiguous in the frequency domain. The first TRU 402 includes a first frequency resource 406, a second ("$2^{nd}$") frequency resource 408, and a third ("$3^{rd}$") frequency resource 410. The first frequency resource 406 is transmitted in a first time period 412, while the second and third frequency resources 408, 410 are transmitted in a second time period 414. In some embodiments, the first and second time periods 412, 414 may be contiguous in time. Moreover, in various embodiments, the second and third frequency resources 408, 410 may be contiguous in frequency. In certain embodiments, a size of the first frequency resource 406 may be greater than or equal to a size of the second frequency resource 408 and smaller than a combined size of the second and third frequency resources 408, 410.

The first frequency resource 406 may be used to transmit a signal (e.g., time-contiguous signal) to indicate that the first TRU 402 will be used to transmit SA in the second frequency resource 408 and data corresponding to the SA in the third frequency resource 410. In some embodiments, the first frequency resource 406 may be used to transmit a signal to indicate that the first TRU 402 will be used to transmit data in the second and third frequency resources 408, 410, with the data corresponding to an SA transmitted in a different TRU. Moreover, the first frequency resource 406 may include multiple detection slots for transmitting the signal.

The second TRU 416 includes a fourth frequency resource 418, a fifth ("$5^{th}$") frequency resource 420, and a sixth ("$6^{th}$") frequency resource 422. The fourth frequency resource 418 is transmitted in the first time period 412, while the fifth and sixth frequency resources 420, 422 are transmitted in the second time period 414. In various embodiments, the fifth and sixth frequency resources 420, 422 may be contiguous in frequency. In certain embodiments, a size of the fourth frequency resource 418 may be greater than or equal to a size of the fifth frequency resource 420 and smaller than a combined size of the fifth and sixth frequency resources 420, 422. The fourth frequency resource 418 may be used to transmit a signal (e.g., time-contiguous signal) to indicate that the second TRU 416 will be used to transmit SA in the fifth frequency resource 420 and data corresponding to the SA in the sixth frequency resource 422. In some embodiments, the fourth frequency resource 418 may be used to transmit a signal to indicate that the second TRU 416 will be used to transmit data in the fifth and sixth frequency resources 420, 422, with the data corresponding to an SA transmitted in a different TRU. Moreover, the fourth frequency resource 418 may include multiple detection slots for transmitting the signal.

The third TRU 424 includes a seventh frequency resource 426, an eighth ("$8^{th}$") frequency resource 428, and a ninth ("$9^{th}$") frequency resource 430. The seventh frequency resource 426 is transmitted in the first time period 412, while the eighth and ninth frequency resources 428, 430 are transmitted in the second time period 414. In various embodiments, the eighth and ninth frequency resources 428, 430 may be contiguous in frequency. In certain embodiments, a size of the seventh frequency resource 426 may be greater than or equal to a size of the eighth frequency resource 428 and smaller than a combined size of the eighth and ninth frequency resources 428, 430. The seventh frequency resource 426 may be used to transmit a signal (e.g., time-contiguous signal) to indicate that the third TRU 424 will be used to transmit SA in the eighth frequency resource 428 and data corresponding to the SA in the ninth frequency resource 430. In some embodiments, the seventh frequency resource 426 may be used to transmit a signal to indicate that the third TRU 424 will be used to transmit data in the eighth and ninth frequency resources 428, 430, with the data corresponding to an SA transmitted in a different TRU. Moreover, the seventh frequency resource 426 may include multiple detection slots for transmitting the signal.

In one embodiment, on a carrier assigned for V2X service, the available bandwidth in a number of PRBs can be divided into several TRUs. The concrete number of PRBs for SA and its associated data in one TRU may be derived from the available bandwidth for V2X, may be configured by RRC signaling, may be predetermined using a supported packet size for V2X traffic, or may be predefined in a specification.

Within each TRU 402, 416, 424, in one embodiment, the SA may be transmitted at a higher frequency than its associated data, while in another embodiment, the SA may be transmitted at a lower frequency than it associated data. Moreover, in either embodiment, the transmission frequency of the SA relative to its associated data may be fixed for all TRUs 402, 416, 424. By using TRUs 402, 416, 424, a remote unit 102 may be able to derive possible SA positions in each TRU and detect SA and associated data in each TRU assigned for V2X service.

Moreover, within each TRU 402, 416, 424, there is a detection period (e.g., the first period of time 412) that starts from the subframe 404 boundary and has a configurable duration. During the detection period, a remote unit 102 may not transmit any data and may skip reception of data. Before a remote unit 102 can autonomously select a SA resource from a preconfigured resource pool in V2X, the remote unit 102 may need to determine the duration of the detection period. In one embodiment, the duration of the detection period may be configured by RRC signaling from a set of possible value, or may be preconfigured to a predetermined value. In another embodiment, the first M symbols in each subframe may be used as the detection period. M may be configured by RRC signaling for in-network coverage when the corresponding resource pool is configured. Furthermore, M may be preconfigured for out-of-network coverage, or predefined in a specification. In one embodiment, M may be a maximum of 2 symbols. In some embodiments, the detection period may include multiple single detection slots. In one embodiment, the duration of one detection slot may be 9 us, while in other embodiments, the duration may be shorter or longer.

In each TRU 402, 416, 424, a detection bandwidth (e.g., first frequency resource 406, fourth frequency resource 418, seventh frequency resource 426) may start from the PRB used for SA (e.g., second frequency resource 408, fifth frequency resource 420, eighth frequency resource 428) and may have a configurable bandwidth. During detection of a TRU that a remote unit 102 may use, the remote unit 102 may detect the received energy on the REs covering the detection bandwidth and compare the received energy with a predetermined threshold to determine whether the TRU associated with the detection bandwidth is being used by another remote unit 102 for transmission. The predetermined threshold may be defined in a specification, preconfigured in the remote unit 102, or configured by RRC signaling. Moreover, the concrete bandwidth of the detection bandwidth in each TRU 402, 416, 424 may be configured by RRC signaling, preconfigured using detection accuracy, the bandwidth of data part and leaked power due to in-band emission, or defined in a specification. In certain embodiments, only REs in the detection bandwidth and in the detection period in each TRU 402, 416, 424 are used for the remote unit 102 to send a dummy signal or a predefined sequence (e.g., time-contiguous signal) used for TRU reservation.

Figure 5:
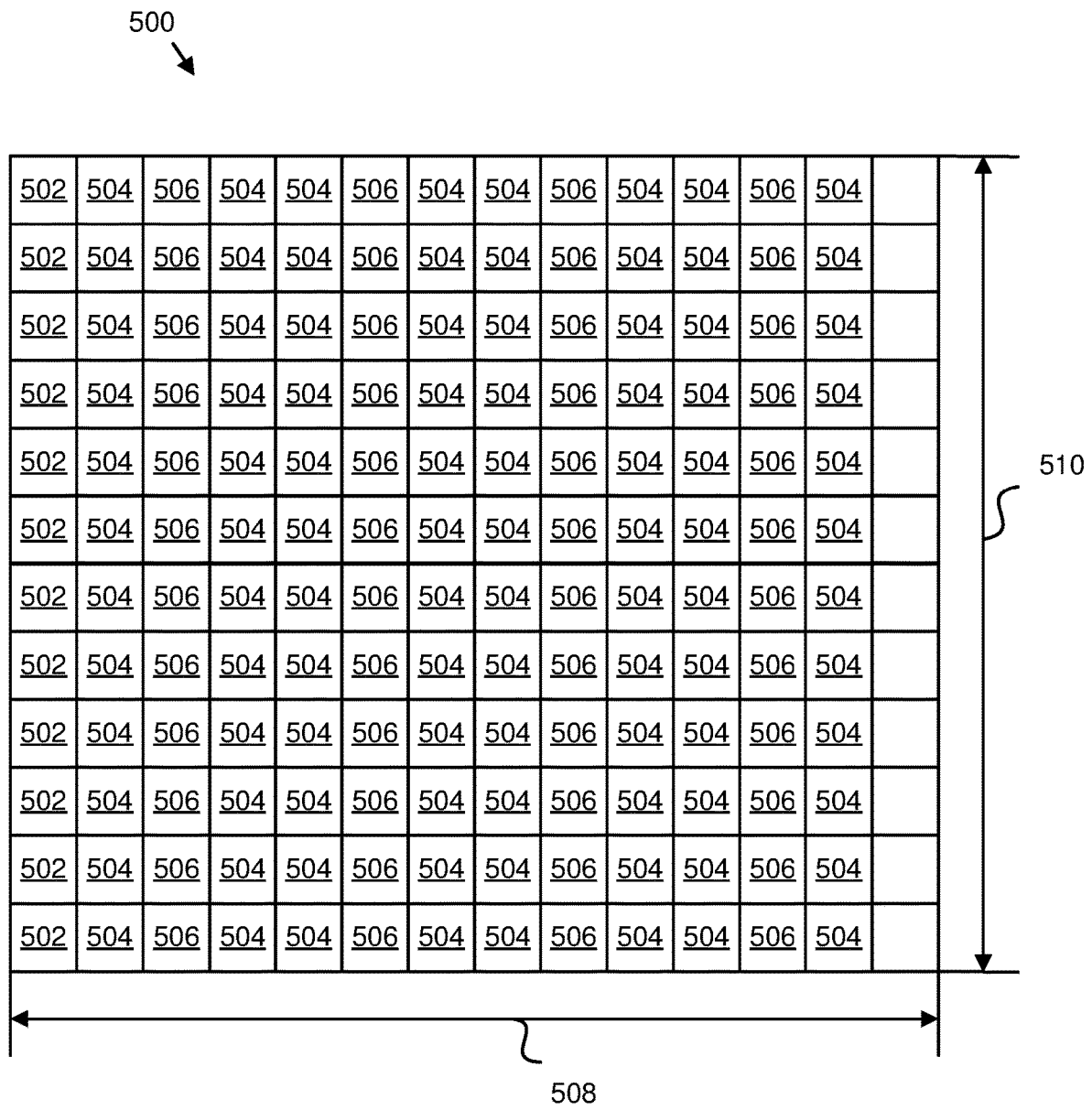
FIG. 5 is a schematic block diagram illustrating another embodiment of communication for collision avoidance.

FIG. 5 is a schematic block diagram illustrating another embodiment of communication 500 for collision avoidance. In the illustrated embodiment, detection periods 502 with a one symbol duration, data REs 504, and DMRSs 506 are transmitted in a single subframe 508 of one PRB 510. As may be appreciated, FIG. 5 is only one example of communication for the PRB 510. As illustrated, detection periods 502 come first in time followed by a repeating pattern of data REs 504 and DMRSs 506.

Figure 6:
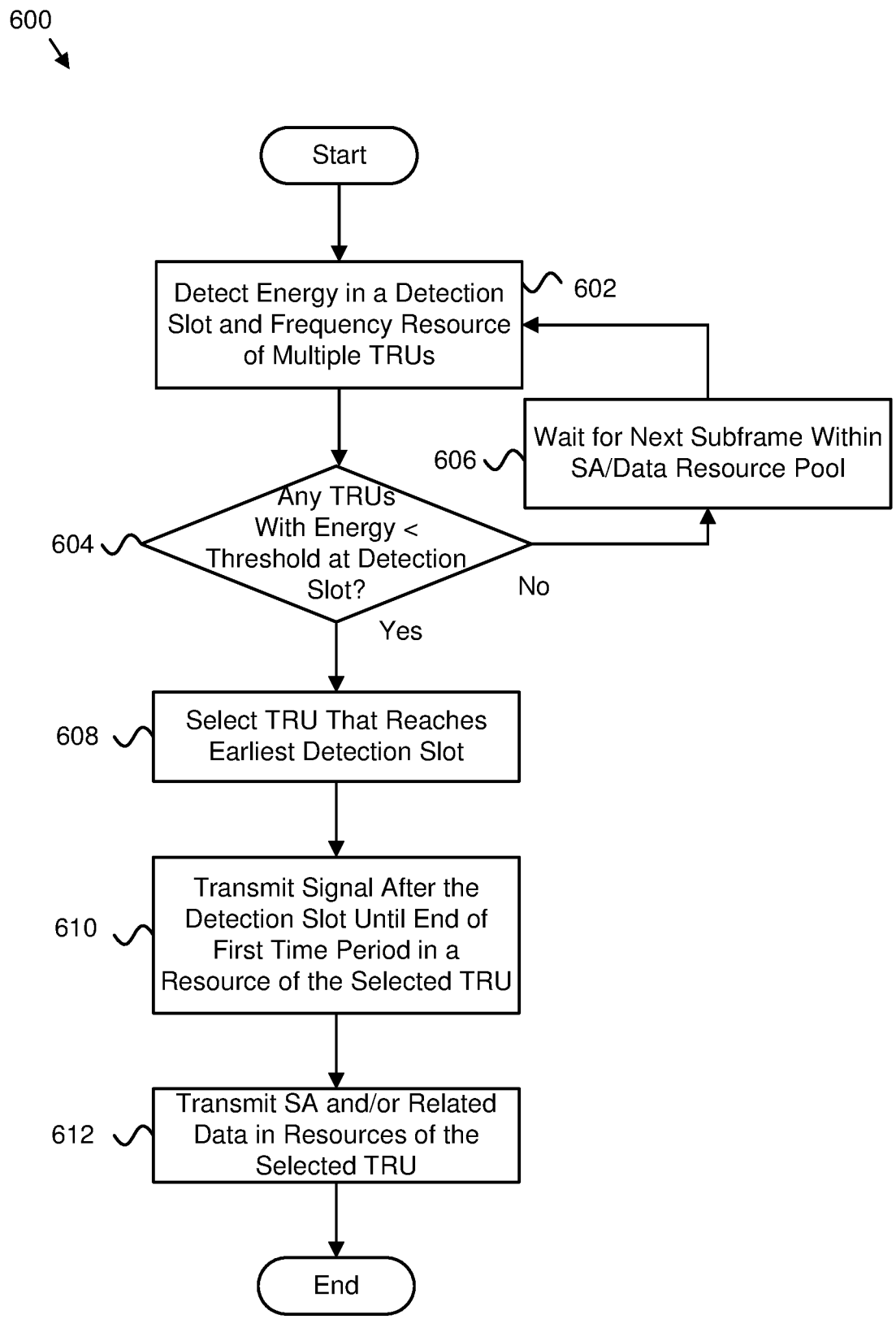
FIG. 6 is a schematic flow chart diagram illustrating one embodiment of a method for collision avoidance.

FIG. 6 is a schematic flow chart diagram illustrating one embodiment of a method 600 for collision avoidance. In some embodiments, the method 600 is performed by an apparatus, such as the remote unit 102 (e.g., vehicle). In certain embodiments, the method 600 may be performed by a processor executing program code, for example, a microcontroller, a microprocessor, a CPU, a GPU, an auxiliary processing unit, a FPGA, or the like.

The method 600 may include detecting 602 energy in a final checked detection slot (e.g., first detection slot) within a first time period (e.g., first time period 412) over a first frequency resource (e.g., first frequency resource 406, fourth frequency resource 418, seventh frequency resource 426) of multiple TRUs (e.g., TRUs 402, 416, 424) concurrently. For example, the method 600 may detect 602 energy in the first TRU 402, the second TRU 416, and the third TRU 424 in parallel. As may be appreciated, the final checked detection slot may not be the first detection slot in the time domain, but may represent a final detection slot that is checked before the first frequency resource of a TRU is used. Moreover, the final checked detection slot may be a different detection slot for each TRU. The method 600 may also include determining 604 whether the energy in any of the TRUs is below a predetermined threshold for the final checked detection slot corresponding to each TRU. One embodiment of determining 604 whether energy is below the predetermined threshold for the final checked detection slot is explained in greater detail in FIG. 7.

In certain embodiments, the first time period includes multiple detection slots including the final checked detection slot, and each detection slot may have a predetermined duration. In some embodiments, the final checked detection slot is a detection slot randomly selected from multiple detection slots within the first time period. In one embodiment, the first time period begins at a subframe boundary.

If there are not TRUs with energy below the predetermined threshold in the final checked detection slot for each TRUs, the method 600 may include waiting 606 for a next subframe within the SA/data resource pool, then the method 600 may return to detecting 602. If there is at least one TRU with energy below the predetermined threshold in the final checked detection slot for each TRU, the method 600 may select 608 a TRU that reaches the earliest in time final checked detection slot (e.g., the TRU with a final checked detection slot that is closest to the beginning in time of the first period of time).

The method 600 transmits 610 a signal (e.g., dummy signal, predetermined signal, time-contiguous signal) in the selected TRU after the final checked detection slot until the end of the first period time. The method 600 also transmits 612 SA and its associated data over frequency resources (e.g., second frequency resource 408, third frequency resource 410) in the selected TRU, then the method 600 may end. In certain embodiments, the method 600 may transmit 612 only SA or data associated with an SA in a different TRU over frequency resources in the selected TRU.

In one embodiment, transmitting the SA and the associated data in the selected TRU includes transmitting the SA at a first frequency and the associated data at a second frequency in a same subframe. In such an embodiment, the first frequency and the second frequency are contiguous in a frequency domain and the first frequency is greater than the second frequency. In another embodiment, transmitting the SA and the associated data in the selected TRU includes transmitting the SA at a first frequency and the associated data at a second frequency in a same subframe. In such an embodiment, the first frequency and the second frequency are contiguous in a frequency domain and the first frequency is less than the second frequency.

In one embodiment, transmitting the SA and/or the associated data in the selected TRU includes transmitting data associated with an SA at a first frequency and a second frequency in a same subframe, with the data being associated with an SA transmitted in a different TRU. In such an embodiment, the first frequency and the second frequency are contiguous in a frequency domain and the first frequency is greater than the second frequency. In another embodiment, transmitting the SA and/or the associated data in the selected TRU includes transmitting data associated with an SA at a first frequency and a second frequency in a same subframe, with the data being associated with an SA transmitted in a different TRU. In such an embodiment, the first frequency and the second frequency are contiguous in a frequency domain and the first frequency is less than the second frequency.

In one embodiment, the method 600 may determine at least one of a size of the first TRU, the first time period, the second time period, the first frequency resource, the second frequency resource, the third frequency resource, and the predetermined threshold based on configuration information from a network. In another embodiment, the method 600 may determine at least one of a size of the first TRU, the first time period, the second time period, the first frequency resource, the second frequency resource, the third frequency resource, and the predetermined threshold based on preconfigured information. In certain embodiments, at least one of a size of the first TRU, the first time period, the second time period, the first frequency resource, the second frequency resource, the third frequency resource, and the predetermined threshold is defined in a specification.

Figure 7:
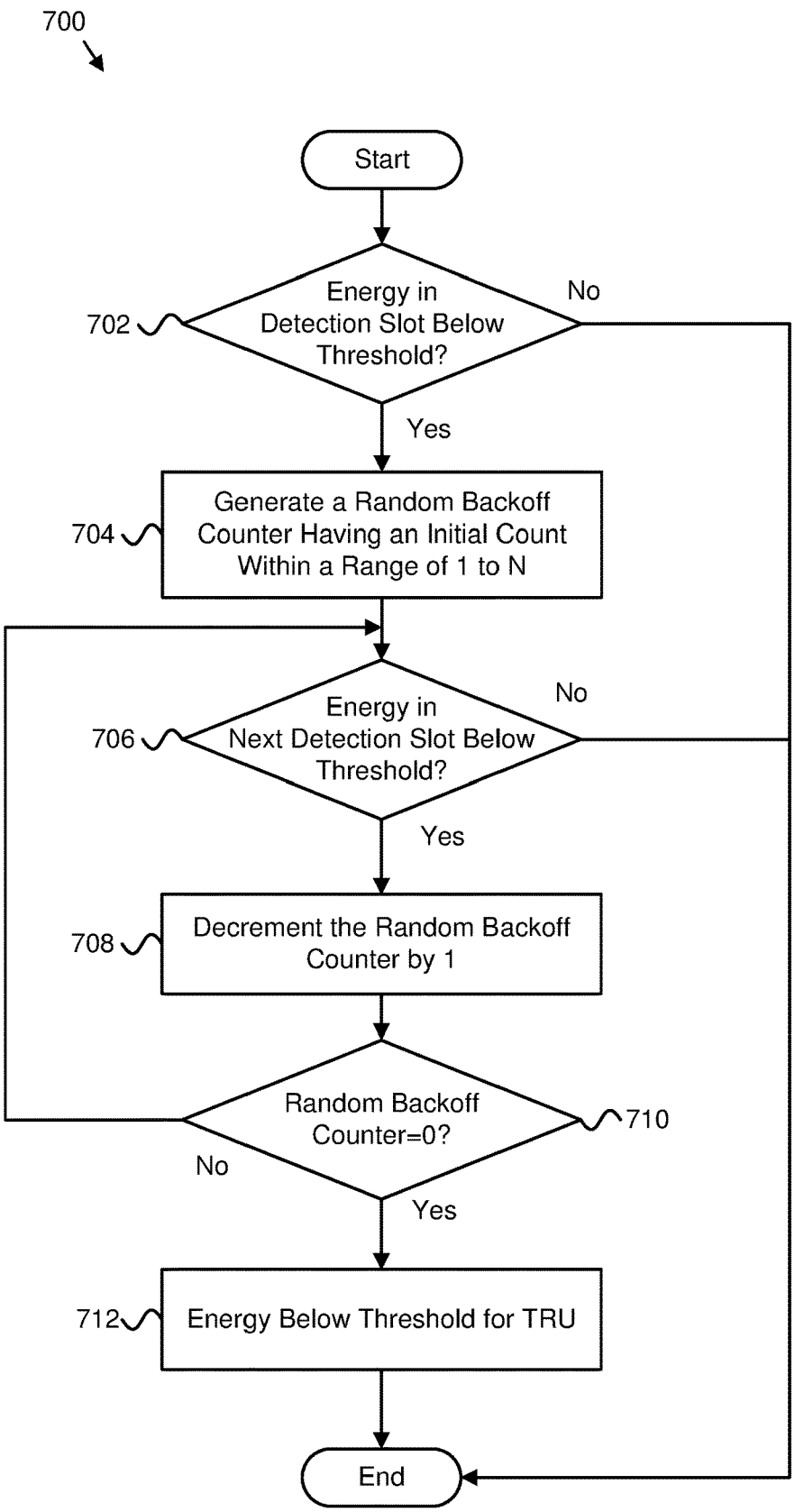
FIG. 7 is a schematic flow chart diagram illustrating one embodiment of a method for determining whether detected energy is below a predetermined threshold for a period of time.

FIG. 7 is a schematic flow chart diagram illustrating one embodiment of a method 700 for determining whether detected energy is below a predetermined threshold for a period of time. In some embodiments, the method 700 is performed by an apparatus, such as a remote unit 102 (e.g., vehicle). In certain embodiments, the method 700 may be performed by a processor executing program code, for example, a microcontroller, a microprocessor, a CPU, a GPU, an auxiliary processing unit, a FPGA, or the like.

The method 700 may include determining 702 whether the energy in a first checked detection slot out of multiple detection slots is below a predetermined threshold. As may be appreciated, the first checked detection slot may be the detection slot positioned at a beginning time of the first time period in a time domain. Moreover, as may be appreciated, the first checked detection slot may be referred to herein as a second detection slot. If the energy in the first checked detection slot is not below the predetermined threshold, the method 700 may end.

If the energy in the first checked detection slot is below the predetermined threshold, the method 700 may generate 704 a random backoff counter having an initial count within a range of 1 to N. As may be appreciated, N may be the highest initial count and 1 may be the lowest initial count. Furthermore, in certain embodiments, the selection of N may be used to ensure that N detection slots plus an Rx-Tx turn-around time (e.g., 20 us) is not longer than the detection period. In some embodiments, N may be set to different values in order to meet latency requirements (e.g., urgent traffic like warning messages may have a smaller N in order to occupy the resource earlier). The method 700 may include determining 706 whether the energy in a next detection slot out of the multiple detection slots is below the predetermined threshold. As may be appreciated, the next detection slot (on the first time that block 706 is performed) may be the second checked detection slot that is checked next after the first checked detection slot (e.g., the second detection slot in from the beginning of the first period of time). If the energy in the next detection slot is not below the predetermined threshold, the method 700 may end.

If the energy in the next detection slot is below the predetermined threshold, the method 700 may decrement 708 the random backoff counter by 1. Then the method 700 may determine 710 whether the random backoff counter is equal to 0. If the random backoff counter is not equal to 0, the method 700 may perform determining 706 using another detection slot (e.g., a next detection slot that comes after the prior next detection slot, a detection slot directly adjacent to the prior checked detection slot). If the random backoff counter is equal to 0, the method 700 may indicate 712 that the energy is below the predetermined threshold for the final checked detection slot, then the method 700 may end. In some embodiments, the final checked detection slot may be referred to as a first detection slot. In such embodiments, the first detection slot is a detection slot reached when the random backoff counter is counted down to zero.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that detects a first energy in a first detection slot within a first time period over a first frequency resource of a first transmission resource unit, wherein the first energy in a first detection slot frequency resource of the first detection slot indicates whether the first transmission resource unit is to be used, and the first transmission resource unit comprises:
the first time period;
a second time period contiguous in time with the first time period;
a second frequency resource; and
a third frequency resource contiguous in frequency with the second frequency resource, wherein the first energy is below a predetermined threshold; and
a transmitter that, in response to the first energy in the first detection slot frequency resource indicating that the first transmission resource unit is to be used:
transmits a first time-contiguous signal after the first detection slot until an end of the first time period over the first frequency resource;
transmits first data within the second time period over the third frequency resource; and
transmits a first scheduling assignment within the second time period over the second frequency resource, wherein the first scheduling assignment includes information related to the first data.

2. The apparatus of claim 1, wherein a size of the first frequency resource is greater than or equal to a size of the second frequency resource and smaller than a combined size of the second and third frequency resources.

3. The apparatus of claim 1, wherein:
the processor detects a second energy in a second detection slot within the first time period over a fourth frequency resource of a second transmission resource unit, wherein the second transmission resource unit comprises:

the first time period;
the second time period;
a fifth frequency resource; and
a sixth frequency resource contiguous in frequency with the fifth frequency resource, wherein the second energy is below the predetermined threshold; and
the transmitter:
transmits a second time-contiguous signal after the second detection slot until the end of the first time period over the fourth frequency resource;
transmits second data within the second time period over the sixth frequency resource; and
transmits a second scheduling assignment within the second time period over the fifth frequency resource, wherein the second scheduling assignment includes information related to the second data.

4. The apparatus of claim 3, wherein a size of the fourth frequency resource is greater than or equal to a size of the fifth frequency resource and smaller than a combined size of the fifth and sixth frequency resources, and wherein the first transmission resource unit and second transmission resource unit are contiguous in frequency.

5. The apparatus of claim 1, wherein:
the processor detects a second energy in a second detection slot within the first time period over a fourth frequency resource of a second transmission resource unit, wherein the second transmission resource unit comprises:
the first time period;
the second time period;
a fifth frequency resource; and
a sixth frequency resource contiguous in frequency with the fifth frequency resource, wherein the second energy is below the predetermined threshold; and
the transmitter:
transmits a second time-contiguous signal after the second detection slot until the end of the first time period over the fourth frequency resource;
transmits second data within the second time period over a combined frequency resource of the fifth and sixth frequency resources, wherein the first scheduling assignment includes information related to the second data.

6. The apparatus of claim 5, wherein a size of the fourth frequency resource is greater than or equal to a size of the fifth frequency resource and smaller than a combined size of the fifth and sixth frequency resources, and wherein the first transmission resource unit and second transmission resource unit are contiguous in frequency.

7. The apparatus of claim 1, wherein the processor determines at least one of a size of the first transmission resource unit, the first time period, the second time period, the first frequency resource, the second frequency resource, the third frequency resource, and the predetermined threshold based on configuration information from a network.

8. The apparatus of claim 1, wherein the processor determines at least one of a size of the first transmission resource unit, the first time period, the second time period, the first frequency resource, the second frequency resource, the third frequency resource, and the predetermined threshold based on preconfigured information.

9. The apparatus of claim 1, wherein at least one of a size of the first transmission resource unit, the first time period, the second time period, the first frequency resource, the second frequency resource, the third frequency resource, and the predetermined threshold is defined in a specification.

10. The apparatus of claim 1, wherein the first scheduling assignment and the first data of the first transmission resource unit are in a same subframe and contiguous in a frequency domain.

11. The apparatus of claim 1, wherein the first time period comprises a plurality of detection slots, the plurality of detection slots comprises the first detection slot, and each detection slot of the plurality of detection slots has a predetermined duration.

12. The apparatus of claim 1, wherein the first detection slot is a detection slot randomly selected from a plurality of detection slots within the first time period.

13. The apparatus of claim 12, wherein the processor that detects the first energy further:
determines whether the first energy is below the predetermined threshold in a second detection slot of the plurality of detection slots; and
if the first energy is below the predetermined threshold in the second detection slot:
generates a random backoff counter having an initial count within a range of 1 to N; and
repeats the following until the random backoff counter is counted down to zero indicating the first detection slot:
determines whether the first energy is below the predetermined threshold in a next detection slot of the plurality of detection slots; and
decrements the random backoff counter by 1 if the first energy is below the predetermined threshold in the next detection slot.

14. The apparatus of claim 13, wherein the second detection slot is a detection slot positioned at a beginning time of the first time period in a time domain.

15. The apparatus of claim 1, wherein the first detection slot is a detection slot reached when a random backoff counter is counted down to zero.

16. The apparatus of claim 1, wherein:
the processor detects a second energy in a second detection slot within the first time period over a fourth frequency resource of a second transmission resource unit, wherein the second transmission resource unit comprises:
the first time period;
the second time period;
a fifth frequency resource; and
a sixth frequency resource contiguous in frequency with the fifth frequency resource, wherein the second energy is below a predetermined threshold; and
the transmitter:
if the second detection slot for the second transmission resource unit is earlier than the first detection slot for the first transmission resource unit:
transmits a second time-contiguous signal after the second detection slot until the end of the first time period over the fourth frequency resource;
transmits second data within the second time period over the sixth frequency resource;
transmits a second scheduling assignment within the second time period over the fifth frequency resource, wherein the second scheduling assignment includes information related to the second data; and
does not transmit the first time-contiguous signal, the first data, and the first scheduling assignment.

17. The apparatus of claim 1, wherein the first time period begins at a subframe boundary.

18. A method comprising:
  detecting a first energy in a first detection slot within a first time period over a first frequency resource of a first transmission resource unit, wherein the first energy in a first detection slot frequency resource of the first detection slot indicates whether the first transmission resource unit is to be used, and the first transmission resource comprises:
    the first time period;
    a second time period contiguous in time with the first time period;
    a second frequency resource; and
    a third frequency resource contiguous in frequency with the second frequency resource, wherein the first energy is below a predetermined threshold; and
  in response to the first energy in the first detection slot frequency resource indicating that the first transmission resource unit is to be used:
    transmitting a first time-contiguous signal after the first detection slot until an end of the first time period over the first frequency resource;
    transmitting first data within the second time period over the third frequency resource; and
    transmitting a first scheduling assignment within the second time period over the second frequency resource, wherein the first scheduling assignment includes information related to the first data.

19. The method of claim 18, wherein a size of the first frequency resource is greater than or equal to a size of the second frequency resource and smaller than a combined size of the second and third frequency resources.

20. The method of claim 18, further comprising:
  detecting a second energy in a second detection slot within the first time period over a fourth frequency resource of a second transmission resource unit, wherein the second transmission resource unit comprises:
    the first time period;
    the second time period;
    a fifth frequency resource; and
    a sixth frequency resource contiguous in frequency with the fifth frequency resource, wherein the second energy is below the predetermined threshold;
  transmitting a second time-contiguous signal after the second detection slot until the end of the first time period over the fourth frequency resource;
  transmitting second data within the second time period over the sixth frequency resource; and
  transmitting a second scheduling assignment within the second time period over the fifth frequency resource, wherein the second scheduling assignment includes information related to the second data.

* * * * *